3,317,616
PROCESS FOR THE PREPARATION OF PER-
FLUORO-TERTIARY-BUTANOL
Viktor Weinmayr, Landenberg, Pa., assignor to E. I. du
Pont de Nemours and Company, Wilmington, Del., a
corporation of Delaware
No Drawing. Filed Sept. 1, 1964, Ser. No. 393,772
9 Claims. (Cl. 260—633)

This invention is directed to a process for preparing perfluoro-tertiary-butanol.

In the past, perfluoro-tertiary-alkanols have been prepared by one of several different processes. For example, perfluoro-tertiary-alkanols have been prepared by the reaction of Grignard reagents or lithium compounds, derived from perfluoroalkyl bromides or iodides, with esters of perfluoroacids or perfluoroketones. [See Haszeldine, J. Chem. Soc., p. 1748 (1953).] Perfluoro-tertiary-alkanols have also been prepared by the reaction of perfluoroketones with bases such as sodium methoxide as disclosed in U.S. Patent 3,091,643.

None of these processes, however, are completely satisfactory for a commercial operation. The processes involving the Grignard reagents or lithium compounds are disadvantageous since the Grignard reagents and lithium compounds are difficult to prepare and require in their preparation the expensive perfluoroalkyl iodides or bromides as starting materials. Furthermore, the processes involving Grignard reagents or lithium compounds require low reaction temperatures since these reagents undergo undesirable side reactions at higher temperatures. The process utilizing sodium methoxide is undesirable since a portion of the perfluoroketone is lost when converted to the alkyl ester of a perfluorocarboxylic acid.

It is, therefore, an object of the present invention to provide a simple and efficient process for preparing perfluoro-tertiary-butanol.

More specifically, the present invention is directed to a process for preparing perfluoro-tertiary-butanol which comprises heating at 75° C. to 250° C. hexafluoroacetone with the compound MF, wherein M is an alkali metal of atomic number 19 to 55, in the presence of water and a solvent. The solvent is chosen from either a polyether of the structure $RO(C_pH_{2p}O)_nR$ or a nitrile of the structure R'CN, wherein R is a lower alkyl, R' is a hydrocarbon group free of atoms other than C and H, $p$ an integer of from two to four and $n$ from one to four. The product of this reaction is $(CF_3)_3COM$ which is converted to the free alkanol, $(CF_3)_3COH$, and subsequently recovered from the reaction mixture.

The present process involves, therefore, the heating in the presence of water both hexafluoroacetone and an alkali metal fluoride and obtaining the alkali metal salt of perfluoro-tertiary-butanol as a reaction product. The other isolated product of this reaction is trifluoroacetic acid. If it is desired to obtain the free alkanol, the alkali metal salt is acidified and the free alkanol steam distilled from the acid solution. For purposes of illustrating the present process, the following empirical equations are given below.

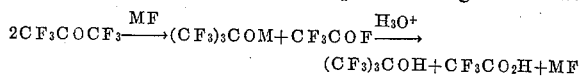

$$(CF_3)_3COH + CF_3CO_2H + MF$$

The alkali fluoride is essential in the reaction. If it is absent, no reaction occurs. The process is carried out in the presence of a solvent which may be either an alkyleneglycol dialkyl ether, a polyalkyleneglycol dialkyl ether or a liquid hydrocarbon nitrile.

The useful and essential fluoride catalysts are those of alkali metals of atomic number 19–55, i.e., potassium, rubidium and cesium. The optimum amount of catalyst is about 0.5 mole per mole of perfluoroacetone. As little as 0.04 mole of catalyst per mole of perfluoroacetone has been used to obtain the perfluoro-tertiary-butanol product. Large amounts of the catalyst are not harmful but do not increase the yields of the product. Other alkali fluorides such as sodium fluoride, lithium fluoride, potassium bifluoride or sodium bifluoride and the related ammonium fluoride do not catalyze the reaction and are not useful. The alkali fluoride is usually used in the commercial anhydrous form. Complete dryness is not required, however, since small amounts of water are necessary in the reaction.

Useful solvents include the polyethers $RO(C_pH_{2p}O)_nR$ and nitriles R'CN. In the polyethers, R is lower alkyl, generally of one to four carbons, $p$ is an integer of two to four and $n$ is an integer from one to four. Examples of the polyethers within this definition and utilized in the present process are $CH_3OCH_2CH_2OCH_3$, $CH_3O(CH_2CH_2O)_2CH_3$, $CH_3O(CH_2CH_2O)_3CH_3$
$CH_3O(CH_2CH_2O)_4CH_3$, $C_2H_5O(CH_2CH_2O)_2C_2H_5$
$C_2H_5O(CH_2CH_2O)_4C_2H_5$, $C_4H_9O(CH_2CH_2O)_2C_4H_9$
$CH_3O(C_3H_6O)_2CH_3$, $C_2H_5O(C_3H_6O)_4C_2H_5$ $CH_3O[(CH_2)_4O]CH_3$ and $CH_3O[(CH_2)_4O]_2CH_3$. In the nitriles R'CN, R' is hydrocarbon group free of atoms other than carbon and hydrogen. Thus, R' may be an alkyl, including cycloalkyl group, a carbocyclic aromatic group, an aralkyl group or an alkaryl group. The nitriles are preferably liquids. Some examples are acetonitrile, propionitrile, butyronitrile, valeronitrile, capronitrile, caprylonitrile, caprinitrile, lauronitrile, benzonitrile, the tolunitriles, phenylacetonitrile or hexahydrobenzonitrile. The preferred solvents are acetonitrile and the polyethers $CH_3O(CH_2CH_2O)_nCH_3$ and $C_2H_5O(CH_2CH_2O)_nC_2H_5$, where $n$ is 2, 3 or 4. As with the alkali fluorides, the solvents need not be anhydrous since small amounts of water are necessary for the reaction.

Although the solvent is necessary, the relative amount of solvent used is not critical. All that is required is sufficient solvent to partially dissolve the alkali metal fluoride MF. As little as 0.25 mole of solvent per mole of perfluoroketone results in the successful operation of the present process in all cases.

As noted above, a small amount of water in the reaction mixture is required. Generally, the intrinsic amount of water normally contained in the commercially available reactants is sufficient to cause the reaction. If no water is present, no reaction takes place. In general, from this intrinsic amount up to 0.65 mole water per mole of alkali fluoride should be used. It is preferred to use from 0.15 to 0.25 mole of water per mole of alkali fluoride. However, increased amounts of water above the defined range cause decreased yields of product. For example, when 0.7 mole water per mole of alkali fluoride is present, no product is obtained.

The process of this invention is carried out at from 75° C. to 250° C. Better results are obtained at 100° C. to 200° C. and the preferred temperature is 150° C. The reaction time is not critical, since product is formed as soon as the reactants are brought together at reaction temperature. Under the preferred conditions of 150 C., about ten hours leads to complete reaction. Since many of the reactants and solvents are volatile under the reaction conditions, the present process is usually carried out in a sealed system and under autogenous pressure. Any materials resistant to reaction conditions, such as steel or nickel alloys, are useful for the construction of the sealed reaction system.

The product of the above-described process is a mixture of alkali metal salt of the perfluoro-tertiary-alkanol along with trifluoroacetic fluoride and unreacted alkali fluoride in the reaction solvent. Removal of the solvents by distillation isolates the alkali metal salts of the perfluoro-tertiary-alkanol. Distillation or steam distillation of a mixture of such salts from dilute aqueous acids yields the free perfluoro-tertiary-alkanol in the form of an aqueous hydrate which may also contain small amounts of solvents. If an anhydrous or solvent-free product is desired, it may be obtained by distillation of either the crude hydrated free alkanol or the alkali metal salt initial product from concentrated sulfuric acid. When a nitrile solvent is used, it is preferable to first hydrolyze the nitrile with alkali before distilling the alkanol from acid.

Perfluoro-tertiary-butanol, $(CF_3)_3COH$, has the following physical characteristics. The butanol is a liquid having a boiling point of 45° C. at one atmosphere and a freezing point of —15° C. It is miscible with solvents such as the chlorofluoroalkanes or carbon tetrachloride. The butanol is quite acidic, and reacts with water at room temperature to form a hydrate which is no longer very soluble in water or miscible with carbon tetrachloride. Silica gel will apparently remove sufficient water from the hydrate so that it becomes miscible with carbon tetrachloride again. The butanol dissolves in aqueous alkali or aqueous ammonia.

The alkali metal salt of the perfluoro-tertiary-butanol may be recovered and isolated for use as an intermediate for the preparation of esters which are themselves useful, well-known compounds in the art. When the metal is cesium, the salt is usually soluble in the defined reaction solvent. On the other hand, the lower atomic weight alkali metal salt such as the potassium salt is generally less soluble in the reaction solvents. The less soluble salts may be recovered by filtration or the like. Isolation of the soluble salts may be accomplished by evaporation of the solvent.

Perfluoro-tertiary-butanol is useful as a solvent for situations requiring high stability to decomposition and to attack by oxidizing agents. The fact that perfluoro-tertiary-butanol is completely fluorinated and does not possess hydrogen attached to carbon enables the alkanol to be resistant to the presence of strong oxidizing agents. Perfluoro-tertiary-butanol, unlike the primary and secondary perfluoro-alkanols, is stable to decomposition and does not lose HF readily in the presence of bases. The perfluoro-tertiary-butanol is also useful as an intermediate in the preparation of several other useful compounds.

The second product of the present process is trifluoroacetic acid or its acid fluoride. It is recovered during the recovery process by acidifying the residue of the reaction mixture and further steam distillation. Trifluoroacetic acid is a commercial product having a multitude of uses described in the art.

Representative examples illustrating the present invention follow. All parts are by weight unless otherwise specified. The alkali metal fluorides and solvents used in the following examples were commercially available materials containing the normal intrinsic amounts of water. The intrinsic amount of water usually contained in each reactant was less than 0.2% by weight.

Example I

A stainless steel autoclave having an operating volume of 1,000 parts water was charged with 300 parts commercial grade diethyleneglycol dimethyl ether, 4 parts water and 203 parts of cesium fluoride. The autoclave was sealed and 341 parts of hexafluoroacetone was added in increments of 50–100 parts over a period of 30 minutes. When about 1.3 moles had been added, the hexafluoroacetone ceased to be adsorbed in the reaction mixture. Further additions of hexafluoroacetone caused the pressure to increase. The pressure increased autogenously until the final pressure reached 90 p.s.i.g. at 15° C. The autoclave temperature was maintained at 10–30° C. during the addition of hexafluoroacetone.

The autoclave was then heated to 150° C. over a 2.5 hour period. The autoclave was maintained at 150–152° C. with agitation for 17 hours but no pressure decrease was observed. It thus appears that the reaction was completed during the initial heating period.

The autoclave was cooled to 0° C. to 10° C. and unreacted gases vented into traps at —60° C. About 10 parts of unreacted hexafluoroacetone were recovered containing traces of trifluoromethane.

Seven hundred and ninety-one parts of the liquid reaction mass containing the cesium salt of perfluoro-tertiary-butanol was diluted with 2500 parts of water, acidified with 180 parts of 96% sulfuric acid and steam distilled, giving 102 parts of crude perfluoro-tertiary-butanol (78.4% pure) as a water-immiscible distillate. The yield of product was 33.8% assuming 0.5 mole product for each mole of perfluoroacetone. The crude perfluoro-tertiary-butanol was again mixed with 200 parts of 96% sulfuric acid and distilled, giving 63 parts of pure perfluoro-tertiary-butanol having a boiling point of 45° C. and a melting point of —15° C. The structure of the product was confirmed by its nuclear magnetic resonance, infrared and mass spectra and by fluorine anaylsis.

The product as distilled from 96% sulfuric acid was miscible with carbon tetrachloride while the steam-distilled product was not, indicating the presence of a hydrate in the latter case. The water of hydration was removed by storing over silica gel.

The pure perfluoro-tertiary-butanol was soluble in dilute aqueous alkali and an aqueous ammonia solution.

The residue of the steam distillation described above was combined with 1500 parts of 96% sulfuric acid and further steam distilled. The initial 1881 parts of distillate required 1.75 moles sodium hydroxide for neutralization. The neutralized distillate was evaporated to dryness on a steam bath, giving 200 parts of sodium trifluoroacetate. This salt was combined at 0° C. to 10° C. with 500 parts of 96% sulfuric acid and distilled, giving 116 parts trifluoroacetic acid, distilling at 72° C. A portion of the acid was distilled from phosphorus pentoxide, giving trifluoroacetic anhydride (B.P. 41° C.). Both products were identified by their infrared spectra.

When the above procedure is repeated except that rubidium fluoride was used instead of cesium fluoride, substantially the same results are obtained.

Example II

A pressure tube of 450 parts water capacity was charged with 78 parts acetonitrile, 2.5 parts water, 100 parts cesium fluoride and 200 parts hexafluoroacetone. The tube was sealed and heated to 200° C. in about two hours, then maintained at 200° C. with agitation for ten hours. After cooling to 0° C., the unreacted gases (29 parts) were vented and the contents (343 parts) poured into 2500 parts water. The resulting mixture was made strongly alkaline with 120 parts sodium hydroxide and heated under reflux for ten hours. It was then acidified with 580 parts of 96% sulfuric acid and steam distilled, giving 33 parts crude perfluoro-tertiary-butanol. The crude product was redistilled from 100 parts of 96% sulfuric acid, giving 21 parts of pure perfluoro-tertiary-butanol having a boiling point of 45° C. The over-all yield for the product was 14.6% based on 0.5 mole of product per mole of perfluoroacetone.

When the above procedure was carried out at 100° C. for ten hours, the yield of pure perfluoro-tertiary-butanol was 3%.

Example III

A mixture of 100 parts tetraethyleneglycol dimethyl ether (containing an intrinsic amount of water which measured to 0.1% by weight), 15.8 parts cesium fluoride (containing an intrinsic amount of water which measured to 0.5% by weight), and 200 parts hexafluoroacetone was charged into the pressure tube of Example II. The reactants were not dried before being used. The tube was heated to 150° C. over a three-hour period, then agitated for twelve hours at 150° C. After cooling to 0° C., 164 parts of unreacted gases were discharged and the remaining product combined with 2500 parts water and 300 parts of 96% sulfuric acid and steam distilled, giving 8 parts of crude perfluoro-tertiary-butanol. This was redistilled from 30 parts of 96% sulfuric acid to obtain 2 parts of the pure product having a boiling point of 450 C.

*Example IV*

Using the pressure tube of Example II, a mixture of 120 parts acetonitrile, 3.7 parts water, 30 parts potassium fluoride and 200 parts hexafluoroacetone was heated in the pressure tube at 150° C. with agitation for ten hours. After cooling to 0° C. and removing 97 parts of unreacted gases, the contents of the tube containing the potassium salt of perfluoro-tertiary-butanol, in the amount of 254 parts, were mixed with 2500 parts water and 180 parts of 96% sulfuric acid and steam distilled, giving 100 parts of water-immiscible distillate. The distillate was agitated overnight with 200 parts water and 13 parts sodium hydroxide. The mixture was acidified and 42 parts of crude perfluoro-tertiary-butanol were separated and collected. Distillation from 120 parts of 96% sulfuric acid gave 21 parts of pure perfluoro-tertiary-butanol having a boiling point of 45° C.

*Example V*

Using the pressure tube of Example II, a mixture of 78 parts acetonitrile, 209 parts potassium fluoride and 166 parts hexafluoroacetone was heated in the pressure tube with agitation at 150° C. for ten hours. The reactants were not dried before use, and therefore contained their normal intrinsic amounts of water. After cooling the mixture to 0° C., the unreacted gases were vented and the remainder of the mixture, in an amount of 431 parts, was diluted with 1500 parts water and 200 parts of 36% hydrochloric acid. The 100 parts of oil which separated were distilled from 2500 parts water and 180 parts of 96% sulfuric acid. Crude perfluoro-tertiary-butanol, in the amount of 17 parts, was collected and redistilled from 96% sulfuric acid, giving 7 parts of pure perfluoro-tertiary-butanol having a boiling point of 45° C.

*Examle VI*

The procedure of Example IV was repeated using 3 parts of potassium fluoride rather than 30 parts. After working up the product as in Example IV, a small yield (1 part) of perfluoro-tertiary-butanol was obtained.

*Example VII*

Using the pressure tube of Example II, a mixture of 100 parts benzonitrile, 95 parts cesium fluoride and 200 parts hexafluoroacetone was heated in the pressure tube at 150° C. for ten hours. The reactants contained their normal intrinsic amounts of water. After cooling to 0° C. and venting unreacted gases, the reaction mass, in an amount of 301 parts was diluted with 2000 parts water and 80 parts sodium hydroxide and refluxed for ten hours. The mass was then acidified with sulfuric acid and steam distilled. The oil distillate was taken up in carbon tetrachloride in the presence of silica gel, giving 2 parts of dry perfluoro-tertiary-butanol.

*Example VIII*

Using the pressure tube of Example II, a mixture of 40 parts potassium fluoride, 19 parts acetonitrile, 0.5 part water and 200 parts hexafluoroacetone was heated in the pressure tube at 150° C. for ten hours with agitation. After cooling to 0° C. and venting unreacted gases, the reaction mass, in an amount of 122 parts, was diluted with 2500 parts water containing 40 parts sodium hydroxide and heated under reflux for ten hours. The mixture was then acidified with sulfuric acid and steam distilled, giving six parts of water-immiscible oil. The oil was taken up in carbon tetrachloride and treated with silica gel, giving 6 parts of pure perfluoro-tertiary-butanol.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows.

What is claimed is:

1. A process for preparing an alkali metal salt of perfluoro-tertiary-butanol which comprises heating hexafluoroacetone with the compound MF, wherein M is an alkali metal of atomic number 19 to 55, to a temperature of from 75° C. to 250° C. in the presence of an amount of water not exceeding 0.65 mole of water per mole of the compound MF and a liquid reaction medium selected from the group consisting of nitriles having the structure R′CN and ethers having the structure $RO(C_pH_{2p}O)_nR$, wherein R′ is a hydrocarbon free from atoms other than carbon and hydrogen, R is a lower alkyl of from 1 to 4 carbon atoms, $p$ is an integer of from two to four and $n$ is an integer from one to four, and recovering from the reaction mixture the alkali metal salt of perfluoro-tertiary-butanol.

2. The process of claim 1 wherein the liquid reaction medium is acetonitrile.

3. The process of claim 1 wherein the liquid reaction medium is an ether having the structure $RO(C_2H_4O)_nR$, wherein R is an alkyl of one to two carbon atoms and $n$ is an integer of one to two.

4. The process of claim 1 having the further step of acidifying the alkali metal salt of the perfluoro-tertiary-butanol to convert said salt to the free perfluoro-tertiary-butanol.

5. The process of claim 1 wherein the alkali metal is cesium fluoride.

6. A process for preparing perfluoro-tertiary-butanol which comprises adding incrementally hexafluoroacetone to a sealed pressure vessel at a temperature from 10° C. to 30° C. containing a liquid reaction medium comprising the compound MF, wherein M is an alkali metal of atomic number 19 to 55, from 0.15 to 0.25 mole of water per mole of the compound MF, and a solvent selected from the group consisting of nitriles having the structure R′CN and ethers having the structure $RO(C_pH_{2p}O)R$, wherein R′ is a hydrocarbon free from atoms other than carbon and hydrogen, R is a lower alkyl of from 1 to 4 carbon atoms, $p$ is an integer of from two to four and $n$ is an integer from one to four, heating the mixture to a temperature from 100° C. to 200° C., cooling the reaction mass to from 0° C. to 10° C. and venting the unreacted gases, acidifying the reaction mass, and recovering from the acidified mixture perfluoro-tertiary-butanol.

7. The process of claim 6 wherein the liquid reaction medium is diethyleneglycol dimethyl ether and the compound MF is cesium fluoride.

8. The process of claim 6 wherein the liquid reaction medium is acetonitrile.

9. The process of claim 6 wherein the liquid reaction medium is an ether having the structure $RO(C_2H_4O)_nR$, wherein R is a lower alkyl of one to two carbon atoms and $n$ is an integer from one to two.

References Cited by the Applicant

Haszeldine: Nature, 168, page 1028 (1951).
Haszeldine: J. Chem. Soc., 1748 (1953).
Henne et al.: J. Am. Chem. Soc., 75, page 991 (1953).

LEON ZITVER, *Primary Examiner.*

N. J. KING, *Assistant Examiner.*